July 9, 1946.　　　K. C. GULDEN　　　2,403,434
ABRADING AND POLISHING IMPLEMENT
Filed March 30, 1942　　　2 Sheets-Sheet 1
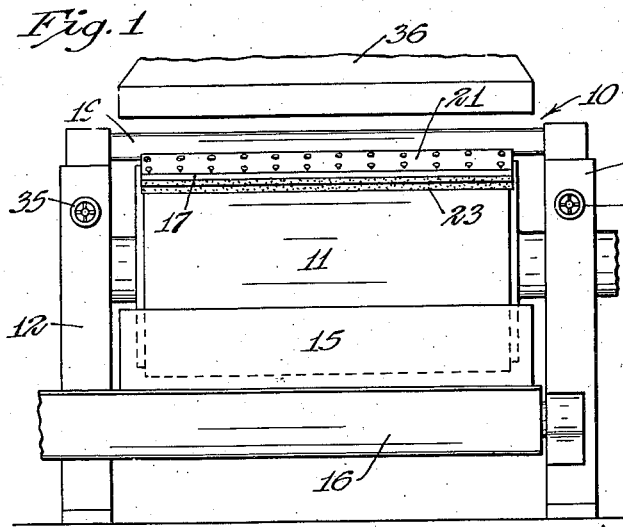
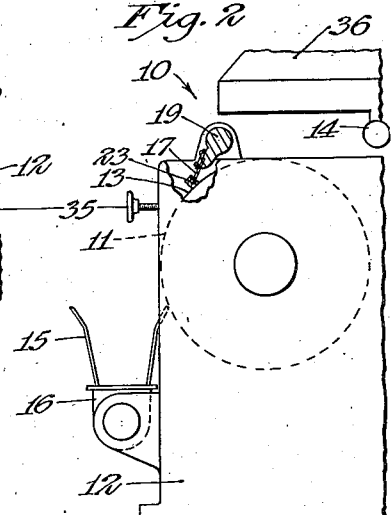
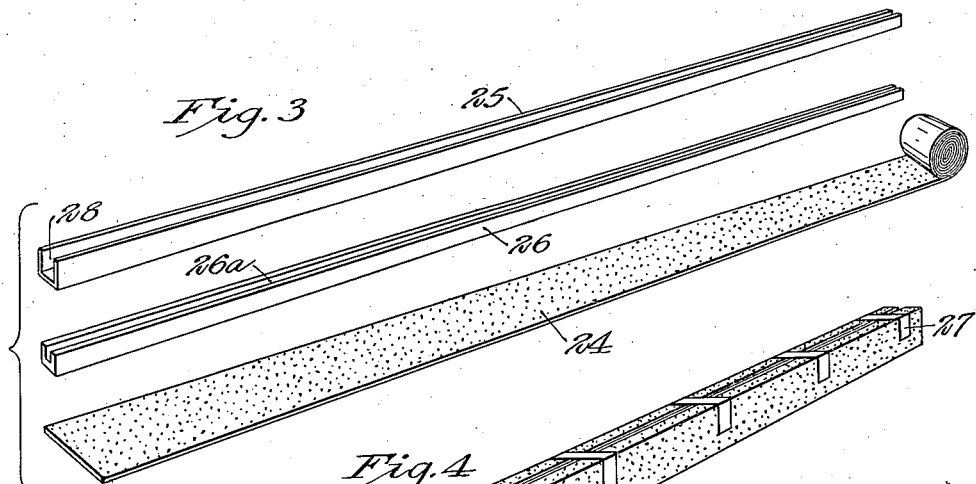
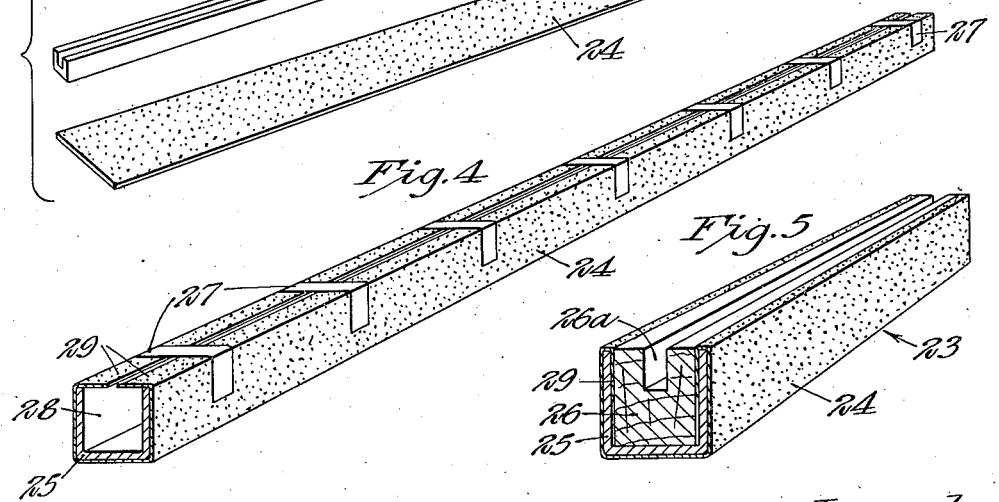
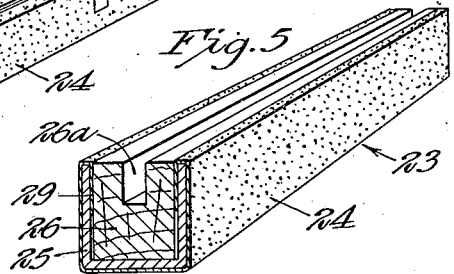
Inventor
Kenneth C. Gulden
By Carpenter, Abbott,
Coulter & Kinney
Attorneys July 9, 1946.  K. C. GULDEN  2,403,434
ABRADING AND POLISHING IMPLEMENT
Filed March 30, 1942  2 Sheets-Sheet 2
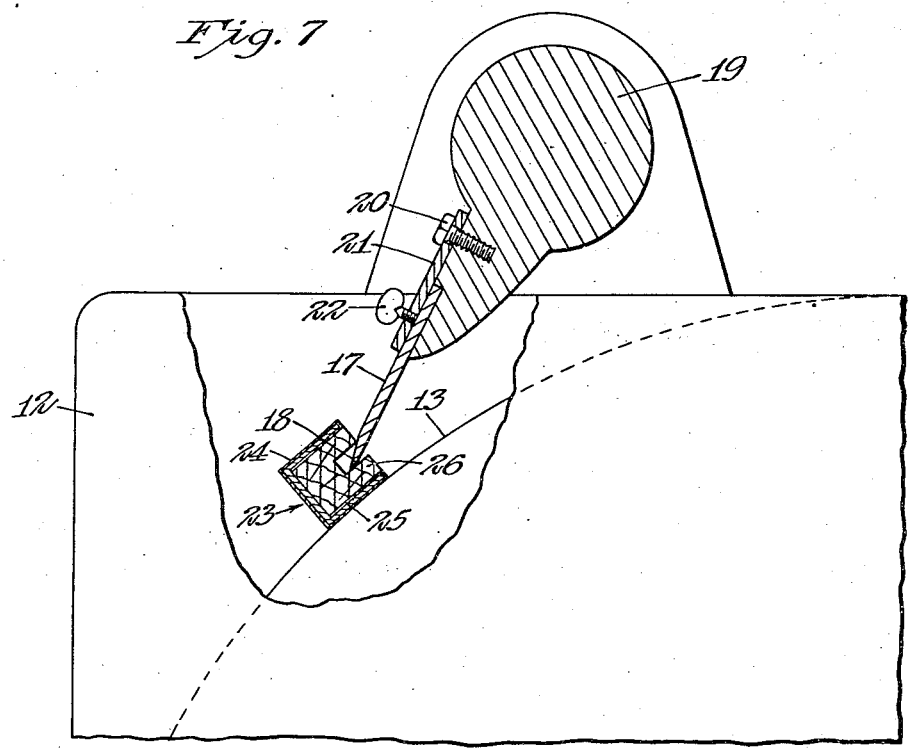
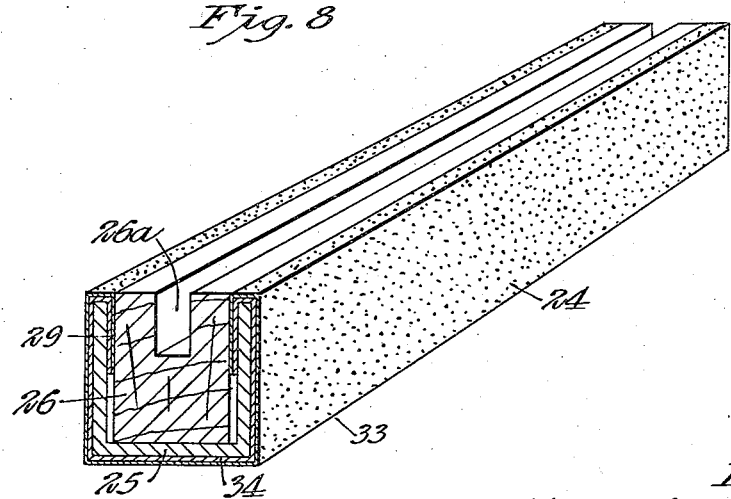
Inventor
Kenneth C. Gulden
By Carpenter, Abbott,
Coulter & Kinney
Attorneys Patented July 9, 1946

2,403,434

UNITED STATES PATENT OFFICE 2,403,434

ABRADING AND POLISHING IMPLEMENT

Kenneth C. Gulden, Gladstone, Minn., assignor to Minnesota Mining & Manufacturing Company, St. Paul, Minn., a corporation of Delaware Application March 30, 1942, Serial No. 436,848

1 Claim. (Cl. 51—185)

This invention relates to a polishing and abrading device, and more particularly to means for supporting and sustaining strips of abrasive or polishing material on a drum.

The invention finds particular utility in abrading, reconditioning, dressing down, polishing and cleaning the surfaces of drums. Drums are employed extensively in the industrial arts in drying liquid material, sprayed or sprinkled upon the surface of the drum, to a solid film. The liquid film is sprinkled or sprayed upon the drum, is customarily dried to a solid film in less than a single revolution of the drum, and is removed therefrom by a knife blade adjustably mounted at an angle to the drum surface. Drums are extensively employed for this purpose in the preparation of dried milk, malted milk, ice cream powder, soap chips, yeast and paper, which are typical of the better known usages of forming solids in film form. In these usages, the surface of the drum is customarily heated to temperatures that vary with the nature of the material being dried for the purpose of accelerating the evaporation of the solvent.

The employment of drums in the production of dried milk is typical of the usages set forth above and others that will be apparent to those skilled in the art. Such drums may be formed of any suitable metal, such as cast iron, steel, stainless steel, and other iron or steel alloys, frequently employing nickel as an ingredient. Copper drums are employed in many fields, but are not suitable in the drying of milk due to the formation of copper salts which contaminate the milk products. A high degree of sanitation is essential in milk drying apparatus and accordingly drums employed for drying milk are washed at least once a day. However, in spite of frequent washings, it is impossible to remove all of the milk film that escapes scraping by the knife blade. The presence of a milk film residue on the drum tends to reduce the quality of the product, since the deposition of additional layers of milk film tends to produce a burnt or caramelized flavor in portions of the milk powder. Additionally, burrs are formed on the edge of the knife blade which tend to scrape off the film irregularly and also cause the drum surface to become rough, pitted and grooved. Furthermore, over a period of time, the high acid content of the milk tends to corrode and pit the drum surface to some extent, at least, no matter how resistant may be the metals of which the drum is formed.

Accordingly, at intervals it is necessary to recondition drum driers to remove corroded spots and to relevel the drum surface in order that the knife blade may remove the milk film evenly and completely. For this purpose it has been the practice in the dried milk industry of periodically returning the drums to the manufacturers for reconditioning. Furthermore, the methods of reconditioning and releveling drum surfaces have not been wholly satisfactory in that the methods employed comprise grinding the drum surface with an abrasive grinding wheel, which inherently removes considerable surface portions of the metal of the drum, thus unduly shortening the useful life of the drum, due to the difficulty of leveling the drum surface with a grinding wheel rotating against the rotating drum without producing additional ridges and irregularities during the grinding operation which have to be removed.

A particular object of the invention, therefore, is the provision of a device whereby film-drying drums may be kept in good working condition at a minimum cost; a further object of the invention is the provision of a device whereby the drums may be reconditioned, polished and cleaned in situ without returning the drums to the manufacturers and without even removing the drum from the drying apparatus, thereby not only saving the cost of shipping the drum but also eliminating loss of working time while the drying apparatus is idle. A further object of the invention is the provision of a polishing or abrading device for film-drying drums adapted to clean the drum surface thoroughly so that the drum surface need be reconditioned only at long intervals.

A particular feature of the invention lies in the fact that my improved polishing or abrading device may be mounted upon the knife blade of the drying apparatus and thus to polish, clean or recondition the drum, it is not necessary that the apparatus be dismantled or that the drum even be removed from the apparatus.

A further feature of the invention lies in the fact that no particular skill or experience is required to employ it, and the average operator of drum drying apparatus can readily learn how to employ the improved abrading and polishing implement and keep the drums in fine working condition without dismantling the apparatus and returning the drum to the manufacturer for reconditioning at frequent intervals. For these and other reasons, particularly the low cost of maintaining film drying drums in perfect working condition by employing my invention, it has been accorded a fine reception by the trade.

In its broader aspects, my improved device comprises a sanding bar which has a channel on one side thereof, adapted to retain the edge portion of the knife blade of the drier, and thus is removably supported by the knife blade on the drum surface as the drum rotates. The improved sanding or polishing bar is provided on its outer surface with a strip of abrasive or polishing material that is resistant to the action of water, and which is preferably removably clamped about the channeled bar in order that it may readily be replaced when its abrading and polishing properties have been lowered by hard usage. For this purpose a plurality of clamping members may be employed, the outer member being channeled and adapted to receive an inner grooved member. The strip of abrasive or polishing material is wrapped about the outer member and has overlapping edge portions which are clamped between the inner and outer bar members to firmly retain the abrasive or polishing material. The assembled implement, whose outer surfaces comprise abrasive or polishing material, is then placed upon the drum surface and the inner member pushed over the edge portion of the knife blade until the knife edge bears against an inner side of the groove. The knife blade is then lowered to retain the abrasive or polishing implement against the drum surface during rotation thereof under a water spray.

In a preferred embodiment, the outer channeled strip is preferably substantially rigid so that it will not conform itself to irregularities in the surface of the drum, but when heavy abrasive material is employed as the outer coating it will remove such irregularities or high spots in the drum surface and relevel the same. Thus the outer channel bar may comprise a piece of ground level channel iron, or it may be formed of any other suitable metal, or hardwood, if desired. The inner member may be formed of wood, which may be any suitable hard wood, or, if desired, it may likewise be formed of iron or other metal.

The outer strip of abrasive or polishing material may comprise a cloth or paper backing having abrasive or polishing grits of any suitable size secured thereon by a waterproof adhesive such as, for example, a synthetic resin of the various types known to the coated abrasive art as being suitable for a waterproof grit binder. For example, phenol-formaldehyde resins are frequently employed to bond the grits to the backing and do not disintegrate when subjected to water. Highly satisfactory results have been obtained by employing, as the abrasive or polishing strip, materials known to the trade as "Wetordry Waterproof Tri-M-Ite" cloth. Material having a cloth backing treated to render it waterproof is preferred, since it is usually stronger and less susceptible to tearing than abrasive strips having a paper backing, although the latter may be employed.

Thus it will be seen from the following description that a more or less unitary abrading and polishing implement is provided, which may be readily assembled and removably mounted on the drying drum, and that it is adapted to clean and polish the surface of a drum as it rotates under a water spray.

The invention will be readily understood from the following description in conjunction with the accompanying drawings, in which:

Fig. 1 is a front elevational view of one type of a conventional drum drying unit on which the invention may be employed and shows the improved abrading and polishing unit mounted thereon;

Fig. 2, a side elevational view of the apparatus shown in Fig. 1;

Fig. 3, a perspective view of the unassembled elements forming my improved abrading and polishing unit;

Fig. 4, an end perspective view of two of the elements forming the unit in a partially assembled condition;

Fig. 5, an end perspective view of the assembled abrading and polishing unit;

Fig. 6, an enlarged cross-sectional view of a strip of abrasive and polishing material adapted to form the outer surface of the unit;

Fig. 7, an enlarged side elevational view of a portion of Fig. 2 showing the improved abrading and polishing unit mounted upon the knife blade of a drying drum; and Fig. 8, a perspective view of a modified form of the improved abrading and polishing unit.

Referring to the drawings, and more particularly to Figs. 1, 2 and 7, the reference character 10 indicates a conventional type of milk drying apparatus which is typical of the apparatus upon which my invention may be employed. In apparatus of this general type, a drum 11 is rotatably mounted on a frame 12 which is equipped with heating means, such as steam supply lines, to heat the drum surface 13 to the desired temperature. The ground surface 13 of the drum 11 is usually formed of an iron alloy although, as previously set forth, particularly for uses other than drying milk, other metals may be employed. The apparatus may include two drums 11 disposed side by side with their axes substantially parallel and with a feed pipe 14 disposed above and between the drums and adapted to spray milk upon both drum surfaces. During the cleaning and polishing of the drum surfaces, as hereinafter described, water is sprayed thereon from the feed pipe 14. A vapor hood 36 is mounted above the drums. A hopper 15 and a milk powder conveyor 16 are disposed below and in advance of the drums.

As best shown in Fig. 7, each drum 11 is provided with a knife blade 17 having a scraping edge 18 extending across the periphery of the drum. The knife blade 17 is secured to a pivotally mounted knife holder 19 by the clamping screws 20 and the plate 21. A plurality of adjusting screws 22 are carried along the lower edge portion of the clamping plate 21 to effect local adjustment of the position of portions of the knife blade. The knife blade 17 may be moved into and away from engagement with the drum surface 13 by the adjusting handles 35 and gears (not shown) disposed in the frame 12.

Referring to Figs. 3, 4 and 5 of the drawings, my improved implement 23 for smoothing and polishing drums comprises a strip 24 of abrasive and polishing material adapted to be wrapped around a channel member 25 and a grooved bar 26 adapted to fit snugly within the channel member 25 and clamp the ends or edges 29 of the abrasive strip 24. All three elements 24, 25 and 26 are of substantially the same length and are adapted to extend across the periphery of a drum to be cleaned or polished. As previously set forth, the sides of the channel member 25 are preferably rigid so that when the device is in use it will not conform itself to irregularities in the drum surface. Accordingly, the channel member 25 may be formed of ground level channel iron, although other metal, and even hard wood, may be employed if desired. The channel member 25 may be 1½ inches by 1½ inches by 1/16 inch by the length of the drum to be polished. The member 26 is preferably formed of hard wood, although it may be made of metal if desired. It is of a size adapted to fit snugly, by frictional engagement with the abrasive surface of the strip ends or edges 29, within the channel member 25 when the ends or edges 29 of the abrasive strip 24 are interposed between it and the sides of the channel member 25. The member 26 is provided with a central groove 26a, which may be 5/8 inch by 5/8 inch, and extends throughout its length.

To assemble the unit 23, the strip of abrasive or polishing material 24 is wrapped around the channel member 25 with its abrasive coated surface outwardly. The abrasive strip may be scored along its folds in order that it will fit closely about the sides of the channel member 25. The abrasive strip is sufficiently wide to envelope approximately completely the channel member 25 and, for example, if the channel member is 1½ inches by 1½ inches, the abrasive strip will be approximately 6 inches wides. As shown in Fig. 4, the abrasive strip may be temporarily held in the desired position by strips of adhesive tape 27, preferably having a pressure-sensitive adhesive in order that the adhesive need not be activated to the operable state by the application of solvents. As shown in Fig. 4 the side edges of the strip approximately meet in a central portion of the channel of the element 25 and the adhesive tape 27 is disposed thereover. The bar 26 is then forced into the channel 28 of the element 25, breaking the tape strips 27 and bending downwardly the edge portions 29 of the abrasive strip 24 until they are flush with the inner sides of the element 25 where they will be retained by reason of snug frictional fit of the grooved bar 26. The ends of the adhesive tape strips 27 may then be removed.

The assembled unit 23 is then ready for mounting upon a drum surface to be smoothed and/or polished. The scraper blade 17 is raised from the drum surface 13 by turning the blade control handles 35, and the abrading and polishing unit 23 is moved into the desired position such that the scraping edge 18 of the knife lies within the groove 26a of the bar 26 and its end or edge bears against an inner side of the groove. The blade adjusting elements 35 are then turned to move the scraper blade 17 toward the drum surface 13 until an abrasive coated side of the unit 23 is seated firmly upon the drum surface 13, as shown in Fig. 7.

The unit is now in position for leveling and/or polishing the drum surface 13. Water is supplied to the feed pipe 14 and is sprayed onto the rear surface of the drum 11 as rotation of the drum is commenced. The drum 11 rotates in a clockwise direction as shown in Figs. 2 and 7 and thus the polishing or abrading unit 23 is firmly held against the drum surface 13 by the scraper blade 17, and a thorough scraping and polishing action is obtained on the surface 13 of the drum 11 as it is rotated. By reason of the water spray, scoring of the drum surface is avoided when abrasive material having coarse grits is employed as the outer covering of the unit 23. After the grits on the side of the unit in engagement with the drum surface have been worn down, it will be understood that the scraper blade 17 may be elevated and the position of the unit 23 on the blade 17 reversed by removing the unit, turning it around and bringing the opposite surface into engagement with the drum surface 13.

A preferred construction of the abrasive strip 24 is shown in Fig. 6, and in the embodiment shown, the strip comprises a backing 30 of fabric and abrasive grits 31 bonded to the backing by any suitable waterproof adhesive coating 32 which may be, as previously set forth, one or more of the synthetic resins known to the art to provide a satisfactory waterproof grit binder. The abrasive grits 31 may be of any desired size and may be formed, for example, of silicon carbide, alundum and the like. If the drum is in bad condition and has an irregular surface and several low rust spots so that the high spots must be ground down to level the drum surface and to remove the corroded portions, a coated strip 24 having abrasive grits of a coarse grade, such as No. 60 grits, is employed on the outer surface of the unit 23. The length of time necessary to remove the high spots and level the drum surface will obviously vary with the condition of the drum surface. After the high spots have been removed from the drum surface, an abrasive strip 24, having medium size abrasive grits, such as No. 100 abrasive grits, is wrapped about the channel member 25 and secured in position by inserting the clamping bar 26 and the assembled unit remounted on the end or edge 18 of the scraper blade 17 for further grinding of the drum surface. The operation is completed by employing an abrasive strip 24 having fine grits, such as No. 220, as the outer wrapping of the unit 23, to polish the drum surface 13. If the drum is cleaned and polished at frequent intervals by the method described, such as at 10 day intervals for a drum in continuous and active use, usually an abrasive strip having a fine grit, such as No. 220, is employed to clean and polish the drum surface, but occasionally abrasive strips having two different grit sizes are employed as the cleaning and polishing strip 24; for example, strips having medium size and fine grits, such as Nos. 80 and 220 grit sizes, respectively, may be employed to clean and polish the drum surface.

In practice it has been found that due to the unyielding nature of the sides of a metal channel member 25, that the actual abrading surface of the covering 24 is approximately ½ to 5/8 inch. While this abrading and polishing area is entirely satisfactory, in some instances, to obtain a wider abrading surface, such as from an inch to an inch and a quarter, when 1½ inch channel bars are employed, and thus to secure fuller utilization of the abrading surface, a layer of yielding material such as a soft rubber or felt strip may be interposed between the abrasive strip 24 and the channel member 25. This modified construction 33 is shown in Fig. 8 and it will be understood that in assembling the unit, a felt or rubber strip 34 of substantially the same width as the abrasive strip 24 is first wrapped about the channel member 25, and then the abrasive strip 24 is wrapped about the felt or rubber layer. The clamping bar 26 is forced within the channel of the element 25 to retain securely the yielding layer 34 and the outer abrasive strip 24 in the desired position. The modified unit 33 may be mounted upon the end or edge of the scraper blade 17 and employed in abrading and polishing a drum surface in the manner described in connection with the unit 23.

Thus it will be seen that I have provided an improved implement for leveling and polishing the surfaces of drums employed in drying films, and that the unit may be readily assembled and conveniently and easily mounted upon the drying drum without dismantling the drying apparatus.

What I claim is:

For use in apparatus for drying milk or the like which includes a rotatable drying drum and a scraping knife adapted to cooperate with said drum during the drying operation and extending along the length of said drum and mounted in adjustable relation to the surface thereof for removing dried milk from the same, and adapted to be moved away from said surface when desired, structure adapted for use in combination in said apparatus for abrading and polishing the surface of said drum comprising a rigid channel member of approximately the length of said drum, a strip of abrasive coated sheet material wrapped around said channel member and an elongate clamping bar fitting frictionally within said channel member and locking the edge portions of said abrasive strip, thus forming an abrasive assembly, said clamping bar having a central groove adapted to receive the edge of said scraping knife so that said scraping knife serves to support said abrasive assembly in contiguous relation with the surface of said drum in said apparatus during the cleaning and polishing of said drum surface.

KENNETH C. GULDEN.